United States Patent
Myers et al.

(10) Patent No.: US 6,219,543 B1
(45) Date of Patent: Apr. 17, 2001

(54) ENERGY DETECTION DEVICE

(76) Inventors: Howard M. Myers, 5705 Greenview Dr., Greensboro, NC (US) 27409; Russel D. Leatherman, 6106 Four Oaks Ct., Summerfield, NC (US) 27358

( * ) Notice: Subject to any disclaimer, the term of this patent is extended or adjusted under 35 U.S.C. 154(b) by 0 days.

(21) Appl. No.: 09/089,559

(22) Filed: Jun. 3, 1998

(51) Int. Cl.$^7$ ...................................... H04Q 7/34
(52) U.S. Cl. .................... 455/423; 455/67.4; 455/226.2; 340/505; 340/825.54
(58) Field of Search .................. 455/67.1, 67.4, 455/67.7, 226.1, 226.2, 226.4, 407, 421, 423, 424, 425, 558; 340/825.54, 505

(56) References Cited

U.S. PATENT DOCUMENTS 5,239,684 * 8/1993 Ishikura ........................... 455/67.7
5,930,707 * 7/1999 Vambaris et al. .................... 455/424

* cited by examiner

*Primary Examiner*—Lee Nguyen
(74) *Attorney, Agent, or Firm*—Withrow & Terranova, PLLC (57) ABSTRACT

A handheld energy detection diagnostic device for detecting and measuring high frequency energy comprising a pick-up or antenna mechanism coupled to electronics circuitry to receive and evaluate RF energy characteristics being emitted from an RF transmission source. Based upon the level of received energy and the level of expected energy, the device presents a ratio to a technician indicating a degree of performance currently being experienced at a particular device. Diagnostic data is also obtained to indicate to a technician the field geometry of the system being tested. The device is small enough to be handheld and included with a technician's standard set of tools.

1 Claim, 7 Drawing Sheets

FIG. 8

ENERGY DETECTION DEVICE

TECHNICAL FIELD

The present invention relates to the detection of energy levels and field strength indications of RF transponder devices. Specifically, energy detection and field strength indication in the microwave energy range. More specifically, the invention is useful in the consumable energy automation dispensing arts.

RELATED ART

In the world of consumable energy automation, recent developments and advancements now permit customers to fill their automobiles without having to interact with an attendant or an automated device such as a credit card reader. The chief benefits include safety and simplicity. Customers no longer need to expose wallets or purses in search of a credit card, a debit card, or cash.

A customer is issued a small handheld transponder device about the size of a key-chain which is encoded with identification and account data pertinent to that particular customer. The transponder device need not be handheld but may also be mounted somewhere in the car such as the inside area of the front or rear windshield. Further, the transponder device may be active or passive depending on the level of functionality desired by a customer. Active transponders have increased memory and require a power source such as a battery contained within the device to facilitate memory storage. Passive transponders possess limited memory and require no battery. The transponders can be pre-programmed with additional information about the customer such as whether a receipt of a given transaction is desired.

Figure 1:
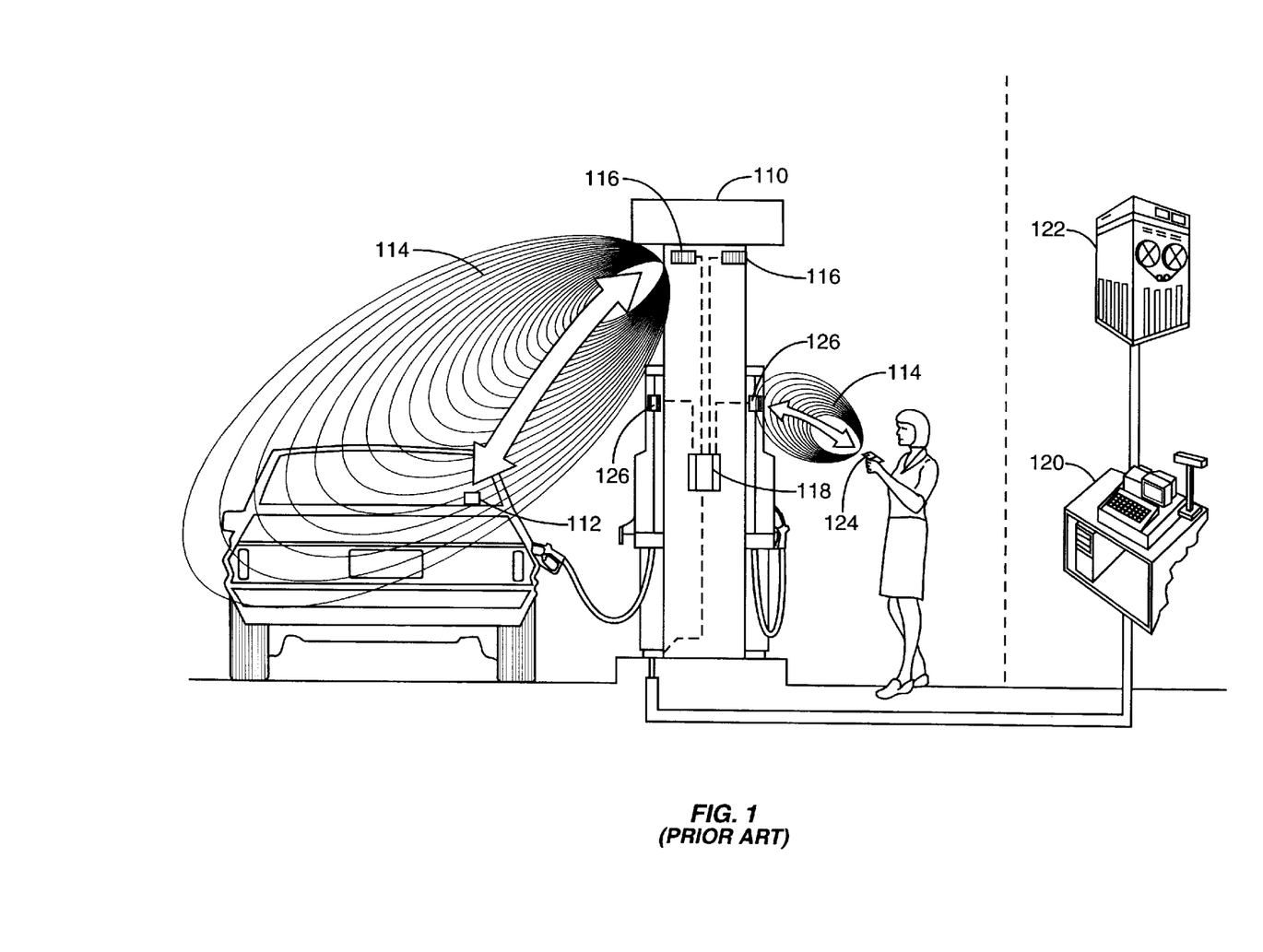
FIG. 1 illustrates a prior art or conventional handheld and car mounted transponder system for purchasing fuel at a gas pump without the need for direct interaction with an attendant or a point-of-sale (POS) device.

FIG. 1 illustrates a prior art handheld and car mounted transponder system for purchasing fuel at a fuel dispensing device 110 without the need for direct interaction with an attendant or a point-of-sale (POS) device. When a car mounted transponder tag 112 is brought within the effective range 114 of an antenna 116 coupled to interrogation device 118 fixed within or on a fuel dispensing pump device 110, the interrogation device 118 communicates with the customer's car mounted transponder tag 112 obtaining the requisite identification and account information regarding the transaction about to be made with that customer. The interrogation device 118 is further connected to a network computer point-of-sale (POS) device 120 for authorizing the requested transaction with a central computer 122. The system works similarly for a handheld transponder tag 124 communicating via antenna 126 with interrogation device 118. The chief difference between car mounted transponder tags 112 and handheld transponder tags 124 is the placement of antenna 126 and the effective range 114 of the handheld transponder tag 124.

For such a retail consumable energy automation system to work reliably it is imperative that the electronics equipment perform at optimum levels at all times. In order to ensure such reliability, an unobtrusive test of the interrogation device is desirable to verify signals are being sent and received without any loss or corruption of data. Moreover, it is desirable to know the field strength of the aforementioned system in order to verify that the system has a sufficient effective range of operation.

The present invention is an energy detection diagnostic device for reading and evaluating several critical factors pertaining to the RF communication of signals between transponder tags and interrogation devices. Field strength and field orientation measurements are determined in order to verify optimal performance of the system. Further, the present invention performs these measurements in an unobtrusive manner that does not require the system to be shut down and mechanically accessed.

DISCLOSURE OF THE INVENTION

The present invention comprises a handheld energy detection diagnostic device for detecting and measuring high frequency energy. The device comprises a pick-up or antenna mechanism coupled to electronics circuitry to receive and evaluate RF energy characteristics being emitted from an interrogation device, for instance. Based upon the level of received energy and the level of expected energy, the device presents a ratio to the operator indicating a degree of performance currently being experienced at a particular interrogation device. The device is small enough to be handheld and included with a technician's standard set of tools.

It is an object of the present invention to provide a device for measuring the field strength of a deployed interrogation device/antenna configuration.

It is a further object of the invention to provide a device for indicating the electric field orientation of a deployed interrogation device/antenna configuration.

It is still another object of the present invention to provide a device that indicates to the operator a relative measurement indicating a degree of performance of a deployed interrogation device/antenna configuration with respect to field strength and electric field orientation.

Further objects of the invention will become apparent to those skilled in the art with reference to the accompanying figures and written description below.

BEST MODE FOR CARRYING OUT THE INVENTION

The present invention is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is described below with reference to flowchart illustrations of methods and systems according to the invention. It will be understood that each block of the flowchart illustrations, and combinations of blocks in the flowchart illustrations, can be implemented by combinations of means for performing the specified functions, and combinations of steps for performing the specified functions.

Figure 2:
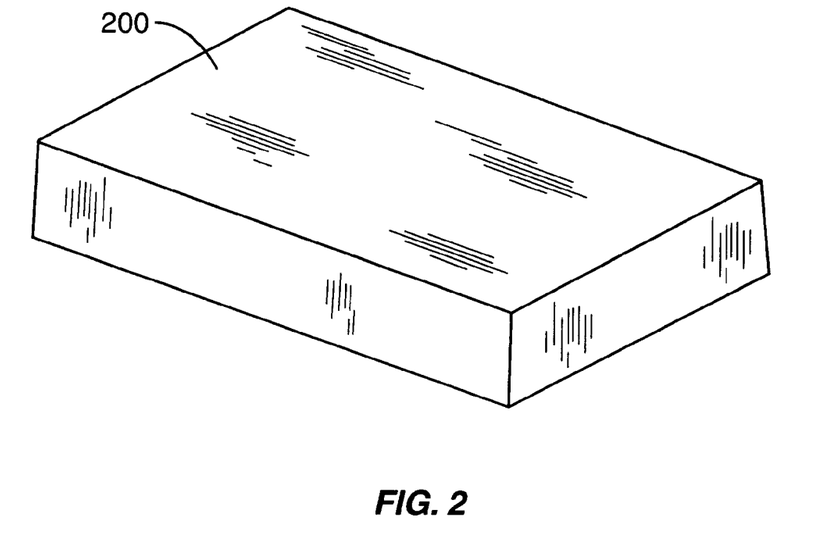
FIG. 2 and FIG. 2A are illustrating the energy detection device of the present invention as seen from the outside top.
Figure 2A:
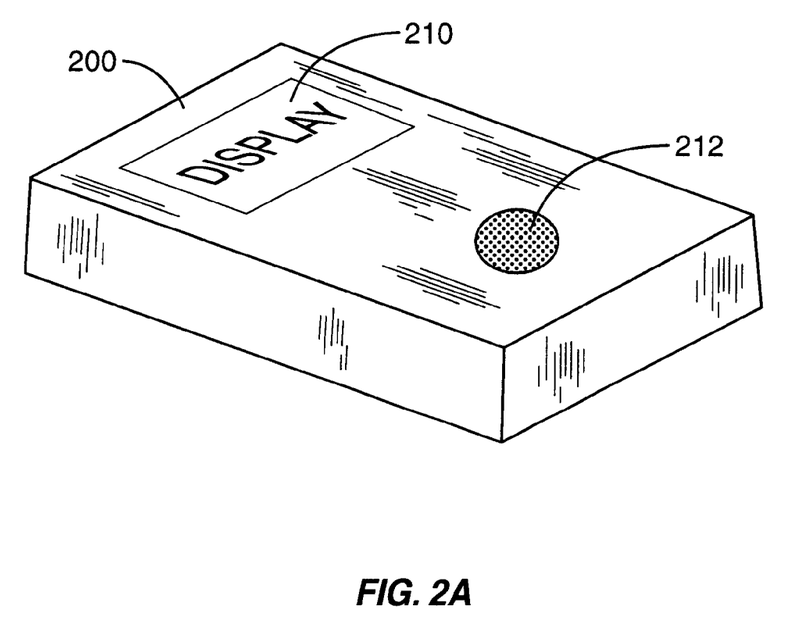

Referring now to FIGS. 1–4 of the drawings, the preferred embodiment of the present invention comprises a handheld diagnostic box-like device (as shown in FIGS. 2 and 2A) capable of determining the output RF field strength of an interrogation box transponder. An interrogation box transponder system is shown in FIG. 1 and has been previously described in the related art section of the present application. Moreover, by varying the orientation of the energy detection device, the operator can also determine the effective field dimensions or geometry of the interrogation box's antenna.

Field geometry is important in consumable energy dispensing since an automobile being filled will necessarily be in a location proximate to the consumable energy dispensing machine. The automobile's tank must be within the reach of the dispenser's hose. In order to be operable for car mounted transponder tags, the interrogation box's field geometry must be sufficient to encompass a transponder tag mounting location that is virtually anywhere on the car. For handheld transponder tags, the considerations for measuring field geometry are slightly different since the transponder tag is more mobile than that of a car mounted transponder tag. For instance, a handheld transponder tag can be brought very close to the fuel dispensing machine in order for a transaction to take place. Nevertheless, it is still important to know and determine the field strength and field geometry of handheld transponder tag systems in order to ensure an interrogation box system is operating at sufficient levels.

FIGS. 2 and 2A illustrate the energy detection diagnostic device of the present invention. FIG. 2 shows a "black box" generally designated 200 containing electronics circuitry (not shown) for detecting and evaluating the presence of an RF field. FIG. 2A illustrates the same general device 200 having a video display 210 for visually indicating the status results of the RF field check. FIG. 2A also shows a speaker 212 for audibly indicating to the operator via a specific tone or beep the status results of the RF field check.

Figure 3:
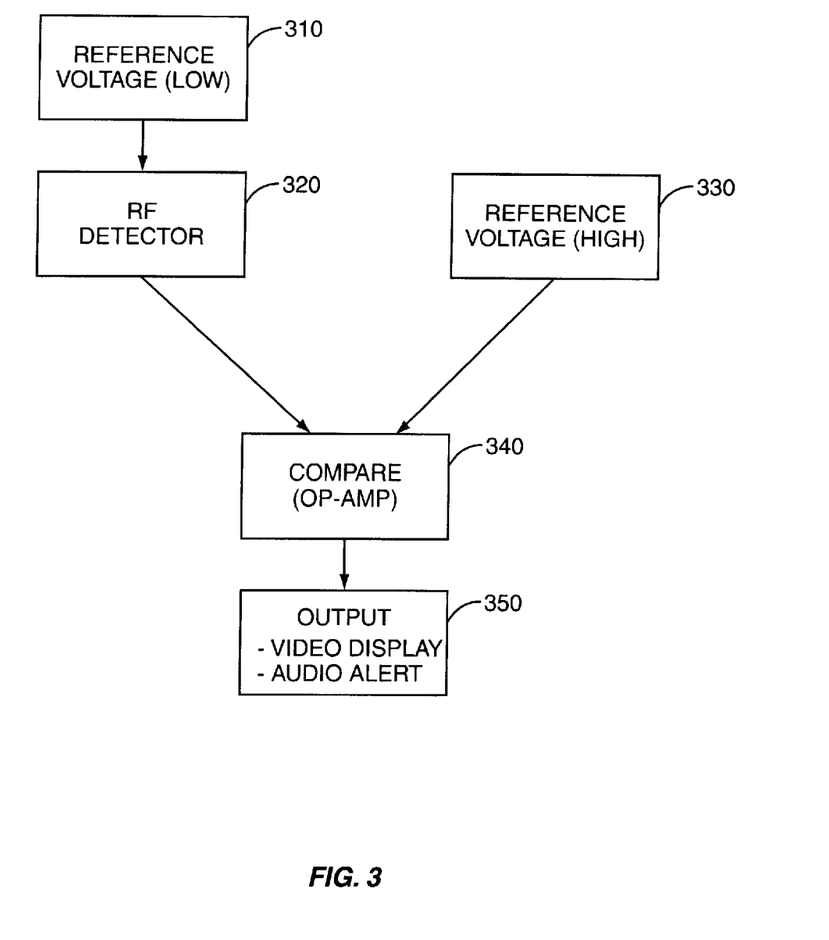
FIG. 3 is a top level block diagram of the logic process employed by the energy detection device.

FIG. 3 is a block diagram of the system logic for the energy detection device of the present invention. The energy detection diagnostic device is placed within the expected transmission and reception range of an automated consumable energy system. Within the device, a low value reference voltage 310 is applied to an RF detector circuit block 320. The output of the RF detector circuit block 320 and a higher value reference voltage 330 are applied to a compare block 340. In the present invention compare block 340 comprises an operational amplifier circuit. The results of compare block 340 are forwarded to an output block 350. Output block 350 can indicate the operational status of the system in either an audio or video fashion.

Figure 4:
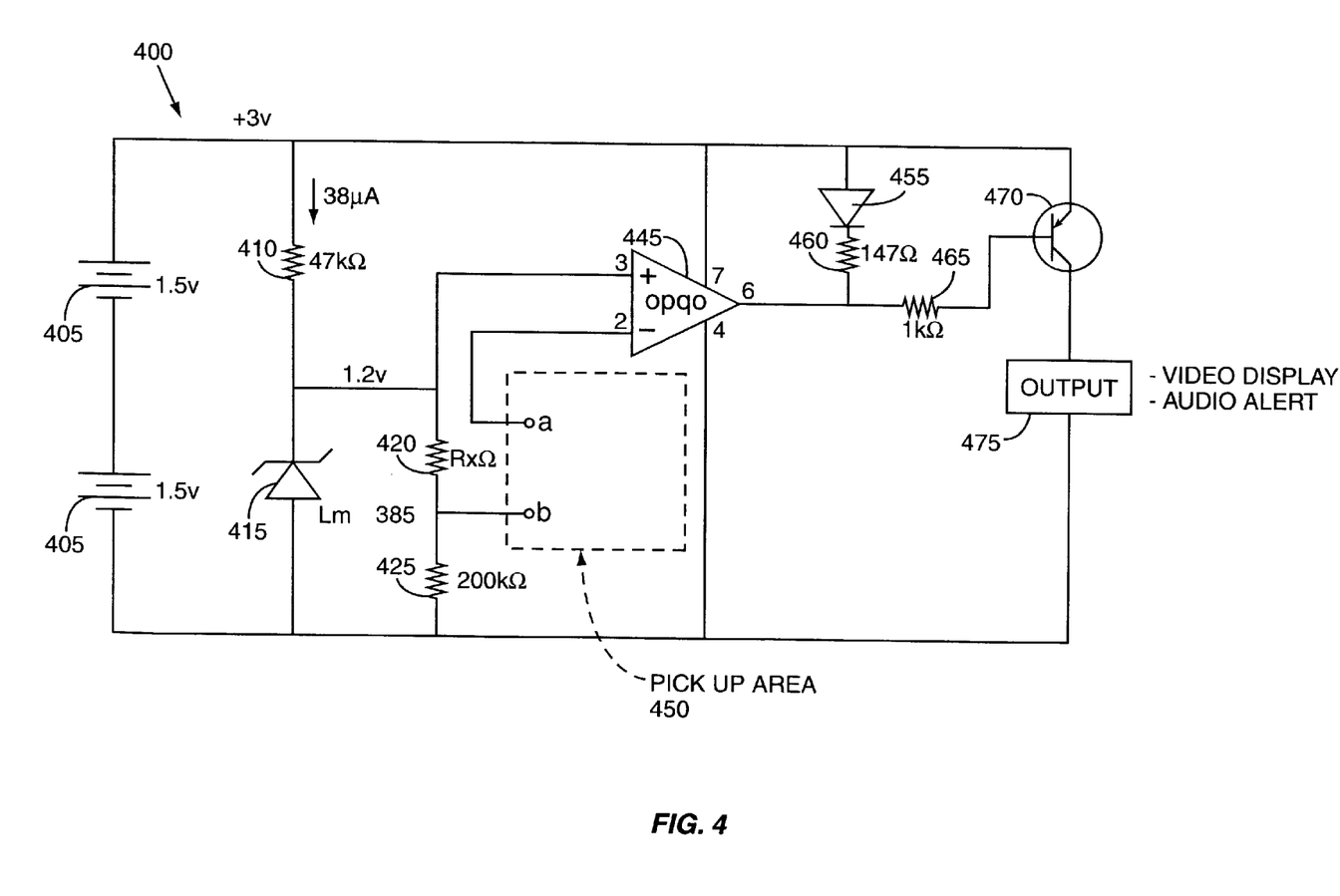
FIG. 4 is a schematic illustrating the basic circuit within the energy detection device.
Figure 4A:
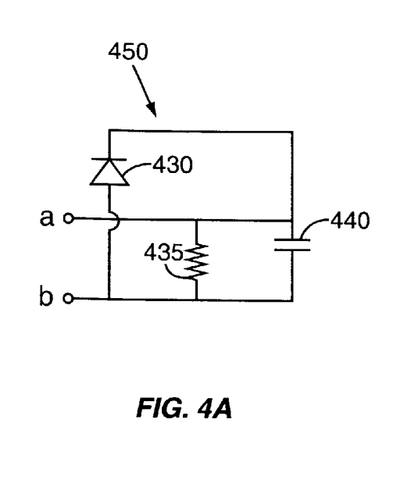
FIG. 4A is a schematic illustrating one embodiment of the pick-up circuitry suitable for high frequency energy.
Figure 4B:
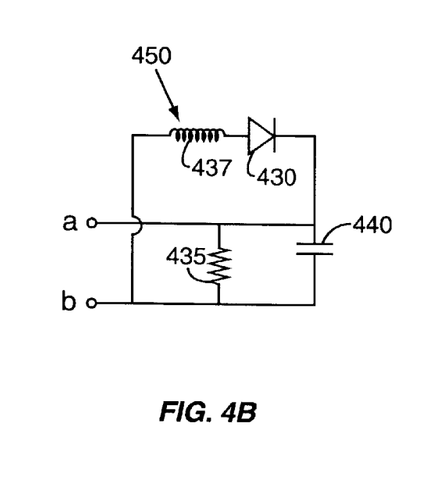
FIG. 4B is a schematic illustrating one embodiment of the pick-up circuitry suitable for low frequency inductive energy.
Figure 4C:
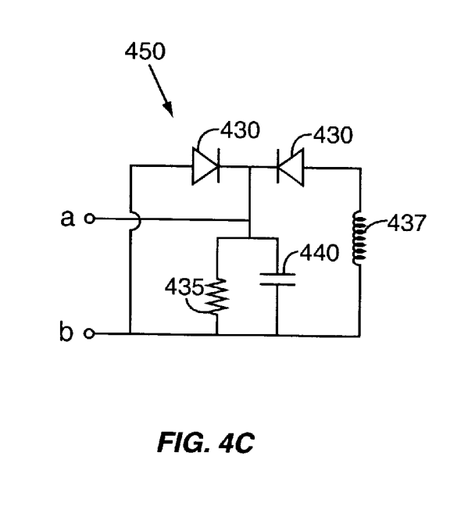
FIG. 4C is a schematic illustrating one embodiment of the pick-up circuitry suitable for both low and high frequency energy.

FIG. 4 illustrates the circuitry within the energy detection diagnostic device of the present invention. The energy detection device employs a pick-up mechanism 450 coupled to an antenna (not shown) to collect RF energy. Three pick-up mechanism 450 embodiments are illustrated in FIGS. 4A, 4B, and 4C, respectively. The pick-up mechanism 450 of FIG. 4A comprises an RC network (435 and 440) and diode 430 to create a DC signal from the AC RF signal received at the antenna. Specifically, the detected RF energy is fed to the RC network (435 and 440) which develops a DC value in the presence of an RF field. A reference voltage is used to develop a known stable voltage on the order of 1.2 volts. This reference voltage will not vary with time. A resistive voltage divider (420 and 425) is employed to create a second stable voltage on the order of 5 millivolts below the 1.2 v reference voltage. The second, lower, voltage is coupled to the negative terminal of the RC network (435 and 440). The positive terminal of the RC network (435 and 440) is coupled to the negative input of an operational amplifier 445. The positive input of the operational amplifier 445 is coupled to the higher of the reference voltages. Upon sufficient presence of RF energy, the operational amplifier 445 will trigger a transistor 470 which in turn drives an output device 475 notifying the operator of the energy detection device of the presence of RF energy. In its quiescent state, the entire network draws a minimal current of less than 50 microamps. The presence of an RF energy field is enough to have the operational amplifier 445 activate transistor 470 which in turn drives output device 475.

The pick-up mechanism 450 configuration of FIG. 4A is most suitable for high frequency energy systems. The other two pick-up mechanisms 450 operate similarly to that of FIG. 4A. One of ordinary skill in the art can easily substitute one pick-up mechanism 450 for another without departing from the spirit or scope of the present invention. The choice of pick-up mechanisms is based upon the frequency of energy desired to detect. For instance, the pick-up mechanism 450 configuration illustrated in FIG. 4B is most suitable for low frequency inductive energy systems while the pick-up mechanism 450 configuration illustrated in FIG. 4C is suitable for both low and high frequency energy systems.

The output device 475 can be a visual computer display such as a meter, an LCD, an LED, or any other known in the art. The output device 475 can also be an audio alert such as a beep or a tone or a series of same which serve to notify the operator of the energy detection device of the presence of RF energy. An audio alert is sometimes preferable, especially if the device is being operated in an area of bright lighting which could hinder attempts to read a visual display.

Prior devices have been developed that simply measure the RF power emitted by a system for use by technicians to diagnose and correct the system. A significant drawback in such devices is the inability to quickly and unobtrusively ascertain whether a return signal has been received by the system. That is, such devices can only determine how well a system is transmitting not how well a system is responding to received data. At least not in a quick and unobtrusive manner. The prior art means for verifying system response utilizes RFID (Radio Frequency Identification) test tags. This is both obtrusive and time consuming. It is obtrusive because it ties up the system being tested since the diagnostics of the system have to be accessed thereby taking the system "offline" while being tested. It is time consuming because, while a simple response test using only the RFID test tag can be conducted, test tags are coded to be rejected and must be cleared by a technician from the dispenser before another customer transaction can occur.

The present invention, however, uses a signal testing tool and a test tag in combination to test the effectiveness of the system forward and return RF links. Moreover, it is done unobtrusively on a low level that does not require interaction with other parts of the system.

Figure 5:
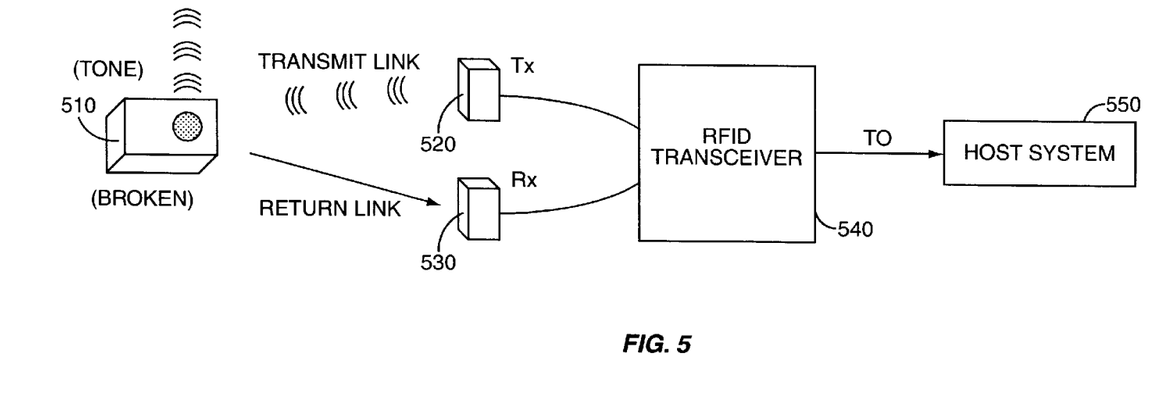
FIG. 5 is a diagram illustrating an energy detection device testing a system that is malfunctioning.
Figure 6:
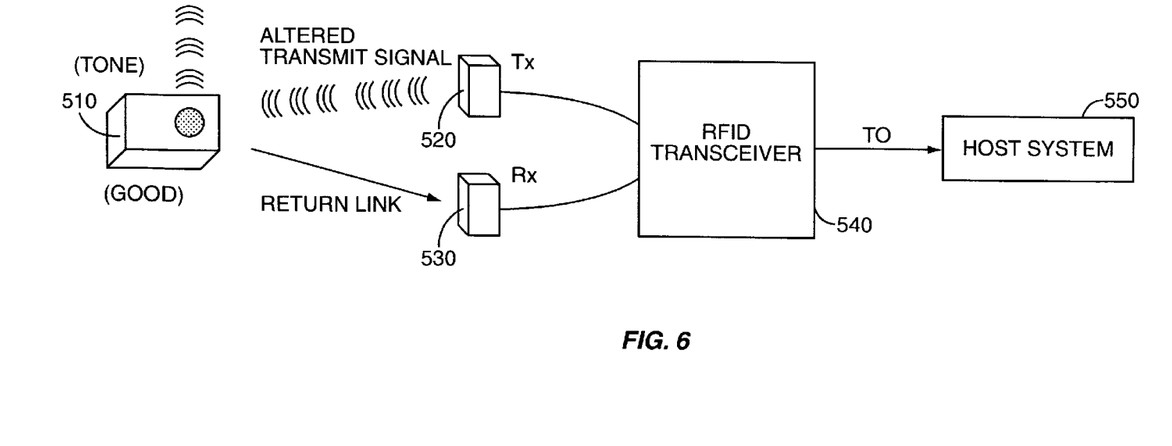
FIG. 6 is a diagram illustrating an energy detection device testing a system that is functioning properly.

FIGS. 5 and 6 illustrate test sequences for a malfunctioning and properly operating system. Currently, diagnostic devices simply put out a tone to mimic the pulsing RF transmission pattern of the RFID transceiver of the system being tested.

The energy detection diagnostic device 510 of the present invention reads the transmission pattern of the dispenser mounted antennas 520, 530 and also provides a beeping tone that mimics the rate of the transmission, the relative RF signal strength, and the transmission pattern of the system's transceiver. Upon detecting a test transponder signal, the system modifies the normal transmission pattern to indicate a received signal. If a technician holds the energy detection diagnostic device proximate to a receive/transmit antenna pair 520, 530 and hears only the normal transmission tone of the transceiver 540, then the technician will know that the return link is malfunctioning or weak because the transmission pattern was not altered. If the system's transceiver is properly operating, the technician will hear the test tag response which is audibly distinguishable from the normal transmission tone. Thus, the technician can quickly and unobtrusively determine by the tone of the return signal if the system's transceiver is receiving RF data from the tag. Use of the system is not impacted during performance of the test.

A first alternative embodiment of the present invention incorporates increased diagnostic processing within the energy detection device. The increased processing calculates a ratio between measured RF field strength and expected RF field strength thereby yielding a more precise indication of a particular system's operating condition. Output results are displayed to the operator utilizing the ratio which permits the operator to determine instantaneously how well and to what degree the system is operating.

The ratio circuit is essentially a means for providing an evaluation of the axial ratio of the field around the transmitting antenna. Axial ratio measurements provide a means for determining whether an antenna is performing properly.

Present systems commonly use a dipole antenna for the return link. Being a dipole, the antenna has a preferred orientation in any incident electromagnetic field. If the antenna is oriented at right angles to the electrical portion of the incident field, there will be minimal pickup, and minimal performance. To alleviate this orientation sensitivity, the transmitting antenna is typically a circularly polarized antenna. Circularly polarized antennas are constructed in a manner which causes the electromagnetic field to rotate after leaving the antenna.

Normally, circular polarization causes the electrical field to be fairly uniform regardless of orientation, providing freedom from orientation sensitivity.

In the event of a problem in the antenna, feed system, or environment, the quality of the circular polarization may be affected, causing for example, a strengthening of the electrical component in the horizontal axis, and a related weakening in the vertical axis. This would translate to variability in transponder tag sensitivity related to transponder tag orientation.

The axial ratio measurement provides an evaluation of the electrical field strength in a first plane versus the electrical field strength in a second orthogonal plane. Two approaches are presented for determining axial ratio and they are illustrated in the block diagrams of FIGS. 7 and 8.

Figure 7:
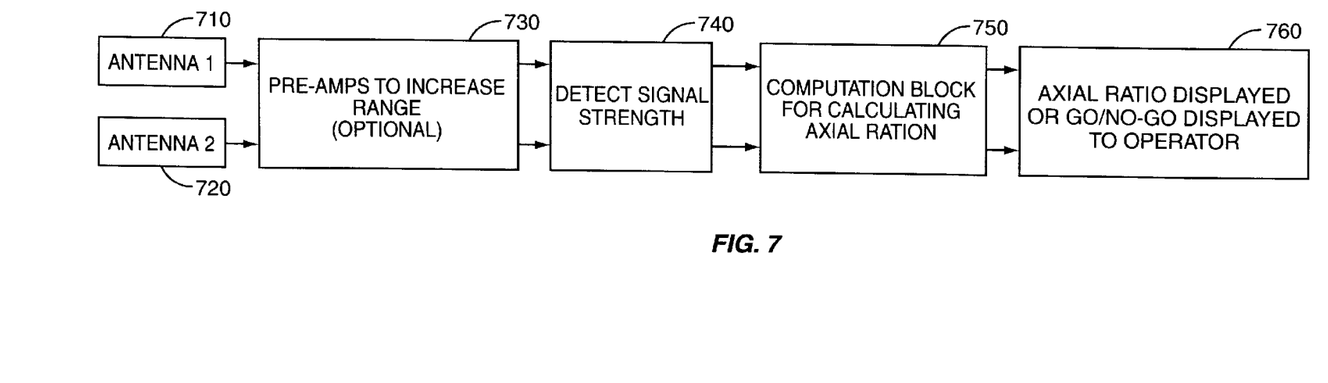
FIG. 7 is a block diagram illustrating the steps for measuring axial ratio using two antennas.

The first approach is illustrated in FIG. 7 and entails using two orthogonal antennas 710, 720 to capture energy in two orthogonal planes. The captured energy signals can then be optionally passed through a pre-amplifier 730 in order to increase the effective range of the test. The signal strength of each antenna 710, 720 is detected 740 and passed to a processing block 750 which calculates the axial ratio of the two signals. The axial ratio can be displayed, or the ratio could be evaluated, and turned into a go/no-go indication. Either way, the results are displayed 760 to a technician.

While the first approach would work, it could potentially incorporate some error into the process since the measurement is based on two distinct points, and not the same point. Any standing wave present in the field could cause an error in the measurements.

Figure 8:
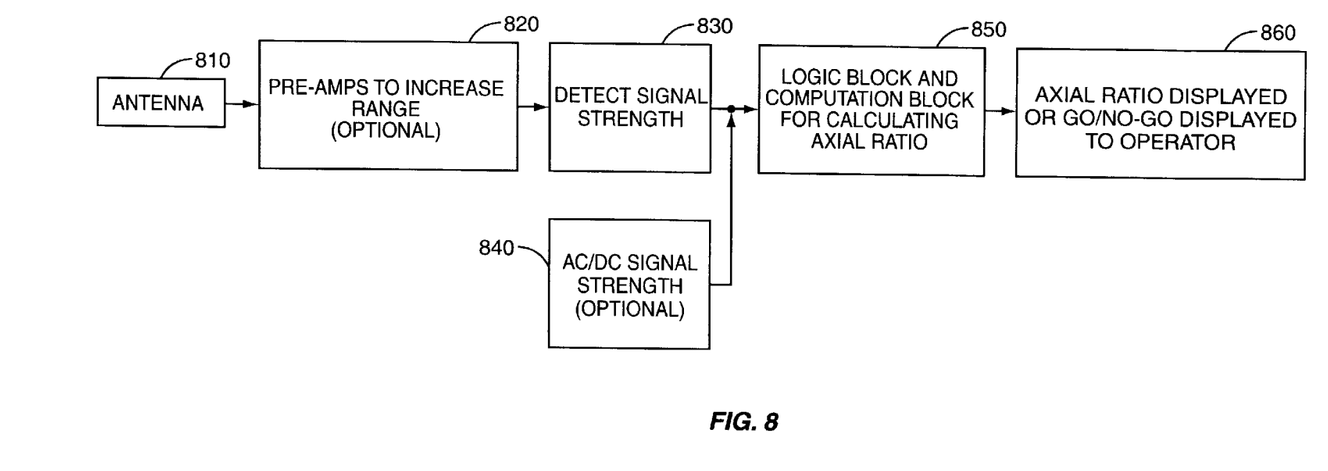
FIG. 8 is a block diagram illustrating the steps for measuring axial ratio using a single antenna.

The second approach, illustrated in the block diagram of FIG. 8, uses a single linearly polarized antenna 810. Antenna 810 captures the present RF energy and is optionally amplified 820 before a strength measurement is detected 830. The signal is then passed to a processing block 850 which captures the first signal reading. The antenna 810 is then rotated 90 degrees and the process is repeated to the point where processing block 850 captures the second signal reading. The processing block 850 would then calculate the ratio of the two readings to determine the axial ratio. Similarly, the results of the axial ratio calculation are displayed 860 to a technician. The second approach is advantageous since it avoids the problems of standing waves, and the measurement can be taken at one point in space.

The present invention is not limited in scope to systems and methods for detecting RF field energy emitted by automated fuel dispensing systems. The present invention may be utilized for detecting RF field energy emitted by other automated consumable energy dispensing systems including, but not limited to, fossil fuels and electrically stored energy. Further, the principles disclosed herein are equally applicable to detection of RF energy for systems other than consumable energy automated dispensing systems. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A radio frequency energy detection device comprising:
   an antenna for collecting RF energy;
   a detection network for determining RF field signal strength coupled to said antenna, said detection network comprising:
   a power source for generating a first voltage reference;
   a resistive voltage divider coupled to said power source for generating a second lower voltage reference;
   an RC network having a positive and negative terminal for collecting RF energy, said resistive voltage divider coupled to the negative terminal of said RC network;

a diode coupled to said RC network for converting collected RF energy from an AC signal to a DC signal;

an operational amplifier having positive and negative inputs and an output, said first reference voltage fed to said operational amplifier positive input, and said operational amplifier negative input coupled to the positive terminal of said RC network; and a transistor coupled to said operational amplifier output for driving said output means; and an output for communicating the results said RF field strength determination to an operator of the energy detection device.

* * * * *